United States Patent [19]
Ellerbush

[11] Patent Number: 5,954,465
[45] Date of Patent: Sep. 21, 1999

[54] FLATBED CYLINDRICAL LOAD SECURING DEVICE

[75] Inventor: James P. Ellerbush, Oregon, Ohio

[73] Assignee: Excell Fabrication Service Inc., Oregon, Ohio

[21] Appl. No.: 08/816,620

[22] Filed: Mar. 13, 1997

[51] Int. Cl.⁶ ..................................................... B60P 7/12
[52] U.S. Cl. .................. 410/49; 410/47; 410/48
[58] Field of Search ................... 410/47, 48, 49, 410/50; 211/13.1, 60.1; 206/397, 446; 248/146, 346.01

[56] References Cited

U.S. PATENT DOCUMENTS

| | | | |
|---|---|---|---|
| 2,622,918 | 12/1952 | Staffe | 410/49 |
| 3,051,099 | 8/1962 | Robertson | 410/102 |
| 3,413,931 | 12/1968 | Augustine, Jr. | 410/47 |
| 3,715,993 | 2/1973 | Orlik | 410/48 |
| 3,829,148 | 8/1974 | Stoneburner | 410/49 |
| 3,875,617 | 4/1975 | Cline | 410/47 |
| 3,922,004 | 11/1975 | Chamberlain | 410/49 |
| 4,102,274 | 7/1978 | Feary et al. | 410/50 |
| 4,204,479 | 5/1980 | Rosa . | |
| 4,315,707 | 2/1982 | Fernbach | 410/47 |
| 4,526,500 | 7/1985 | Patrick | 410/48 |
| 4,772,165 | 9/1988 | Bartkous | 410/139 |
| 5,425,608 | 6/1995 | Reitnouer | 410/49 |
| 5,538,376 | 7/1996 | Borda | 410/99 |
| 5,577,619 | 11/1996 | Callahan | 211/13 |

FOREIGN PATENT DOCUMENTS

| | | | |
|---|---|---|---|
| 838429 | 4/1970 | Canada | 410/49 |

*Primary Examiner*—Stephen T. Gordon
*Attorney, Agent, or Firm*—Marshall & Melhorn

[57] ABSTRACT

A load securing device is provided for securing a cylindrical load to the deck of a flatbed transportation vehicle, such as steel coils. The load securing device of the invention comprises a pair of elongate base members, one secured along each of the side edges of the flatbed. Two elongate load securing members are provided which are positioned transversely to the two base members. These two cross members are positioned one on either side of the cylindrical load. Where the cylindrical load to be secured includes a central opening, such as the eye of a steel coil, a central load securing member is preferably also provided. This central load securing member extends through the eye of the coil and is secured to the flatbed. If the cylindrical load is positioned on the flatbed vehicle with its axis generally parallel to the length of the flatbed, a third pair of elongate members is provided, each of which extends from one of the two load securing members to the other, one on either side of the load.

10 Claims, 4 Drawing Sheets

FLATBED CYLINDRICAL LOAD SECURING DEVICE

BACKGROUND OF THE INVENTION

1. Field of the Invention

This invention relates to the transportation of objects, and particularly to the transportation of large objects which do not have flat bases nor co-planar support members such as legs or wheels. The word "base" is used to refer to the side or surface of an object on which the object is to rest during transportation. Thus, the invention is applicable to objects that do have one or more flat sides, but which are so shaped or dimensioned that it is impracticable for them to rest on their flat sides during transportation. Accordingly, objects with which the invention is concerned will be referred to hereinafter as "cylindrical objects" or "cylindrical loads", but it is to be understood that the invention is equally applicable to the transportation of objects which are not cylindrical in the strict geometric sense of the word, but have uniform or non-uniform, curved or angulated bases. The invention is especially suitable for the transportation of rolls or coils of steel sheeting and the like on flatbed trailers or rail cars.

2. Summary of Related Art

Among the most widely used forms of steel are hot and cold flat rolled sheets. Sheet steel comprises an essential element of many manufactured products, and a number of important industries are dependent upon a continuing and reliable source of this material in order to maintain the efficacy of their operations.

Notwithstanding the great importance of flat rolled sheet steel, its transportation has presented a continuous problem. The common and most efficient means of effecting such transportation is to wind the sheet steel into large and tightly wound coils, to band the coils, and to mound the coils on the flatbed of a truck or a railcar. These coils are quite heavy, generally weighing from one to ten tons or more and, because of the huge size and physical characteristics of the tightly wound sheet metal, tremendous forces are unleashed if the coil should come loose from the transportation vehicle and unwind. The result of such an unwind while the coil is being transported by truck on a crowded highway could be hazardous to people and equipment.

As a result, in the transportation of such heavy metal coils, it is generally necessary to utilize cables or chains to position the coil upon the truck or other transport vehicle. However, the conditions of transport often entail substantial vibration, so that adequate anchorage of the coil requires tight contact between the coil and the chains or cables used to anchor the coil to the supporting base. The combination of heavy vibration and tight contact between the chains or cables and the coil frequently causes damage to the coil, such as bending or severing of coil parts contacted by the chains or cables.

Efforts have been taken to minimize such damage by using such blocks, cardboard, and other items positioned between the coil and the chains or cables. These efforts have not been satisfactory because such protective members shift relative to the coil and the cable or chain, or are broken during transit, thereby enabling direct contact of the chain or cable with the coil and damage to the coil. Their use further entails additional labor in the loading and unloading of the coils.

A number of devices have been developed or suggested to attempt to solve the aforementioned problems. For instance, alternate coil protective members, designed to shield the coil from the securing chains or cables, are disclosed in U.S. Pat. Nos. 3,875,617; 4,204,479; 4,526,500; and 5,538,376. These devices, however, have not been found to be effective in solving the abovementioned problems.

Other cylindrical load securing devices have been suggested which require a modified flatbed transportation vehicle, such as the devices illustrated in U.S. Pat. Nos. 3,922,004 and 4,102,274. Such devices are overly complex and disadvantageously cannot be used with existing flatbed transportation vehicles.

It would therefore be desirable to provide a cylindrical load securing device which can securely retain a heavy cylindrical object on the flatbed of a transportation vehicle without causing damage to such object. It would be further desirable to provide such a load securing device which was relatively simple and easy to use, and which could be used in conjunction with existing flatbed transportation vehicles.

SUMMARY OF THE INVENTION

In accordance with the invention, a load securing device is provided for securing a load to the deck of a flatbed transportation vehicle, such as a flatbed semi-trailer or flatbed railcar. The load securing device of the invention is designed especially for securing cylindrical objects, such as steel coils, during transportation.

The load securing device of the invention comprises a pair of elongate base members which rest on the flatbed of the transportation vehicle. The base members are spaced apart, but lie generally parallel to one another and to the length of the vehicle flatbed. Preferably, each of the two base members is provided with a plurality of through holes spaced along the length thereof, the through holes in one of the base members being substantially coaxially aligned with the through holes in the other base member. In a preferred embodiment, a base member is secured along each of the side edges of the flatbed.

In addition, two elongate load securing members are provided which are positioned transversely to the two base members. Where the axis of the cylindrical load is generally transverse to the base members, the load securing members are thus generally parallel to the axis of the cylindrical load. The load securing members are supported on the upper surface of the base members and are positioned one on either side of the cylindrical load.

The load securing members are designed so that one end thereof overlaps each of the two base members. Through holes in the load securing members are aligned with appropriate through holes in the respective base members, so that both load securing members abut or nearly abut the outer periphery of the cylindrical load. A pin or like device may then be introduced in the aligned through holes to secure the load securing members to the base members.

Where the cylindrical load to be secured includes a central opening, such as the eye of a conventionally wound steel coil, a central load securing member is preferably also provided. This central load securing member extends through the eye of the coil and is secured to the flatbed or, alternately, to the base members.

On occasion, it may be preferable to position the cylindrical object on the flatbed of the transportation vehicle with its axis generally parallel to the length of the flatbed. In this situation, the base members are employed as before and the transverse load securing members are positioned so as to be spaced from the respective ends of the cylindrical object. A third pair of elongate members is provided, each of which extends from one of the two load securing members to the other, one on either side of the load. This third pair of elongate members thus extends generally along the length of the flatbed and in the same direction as the base members. Where the cylindrical load includes a central opening, a central load securing member is preferably also provided.

BRIEF DESCRIPTION OF THE DRAWINGS

The above, as well as other advantages of the invention, will become readily apparent to those skilled in the art from the following detailed description of a preferred embodiment when considered in the light of the accompanying drawings, in which.

DESCRIPTION OF THE PREFERRED EMBODIMENTS

Figure 1:
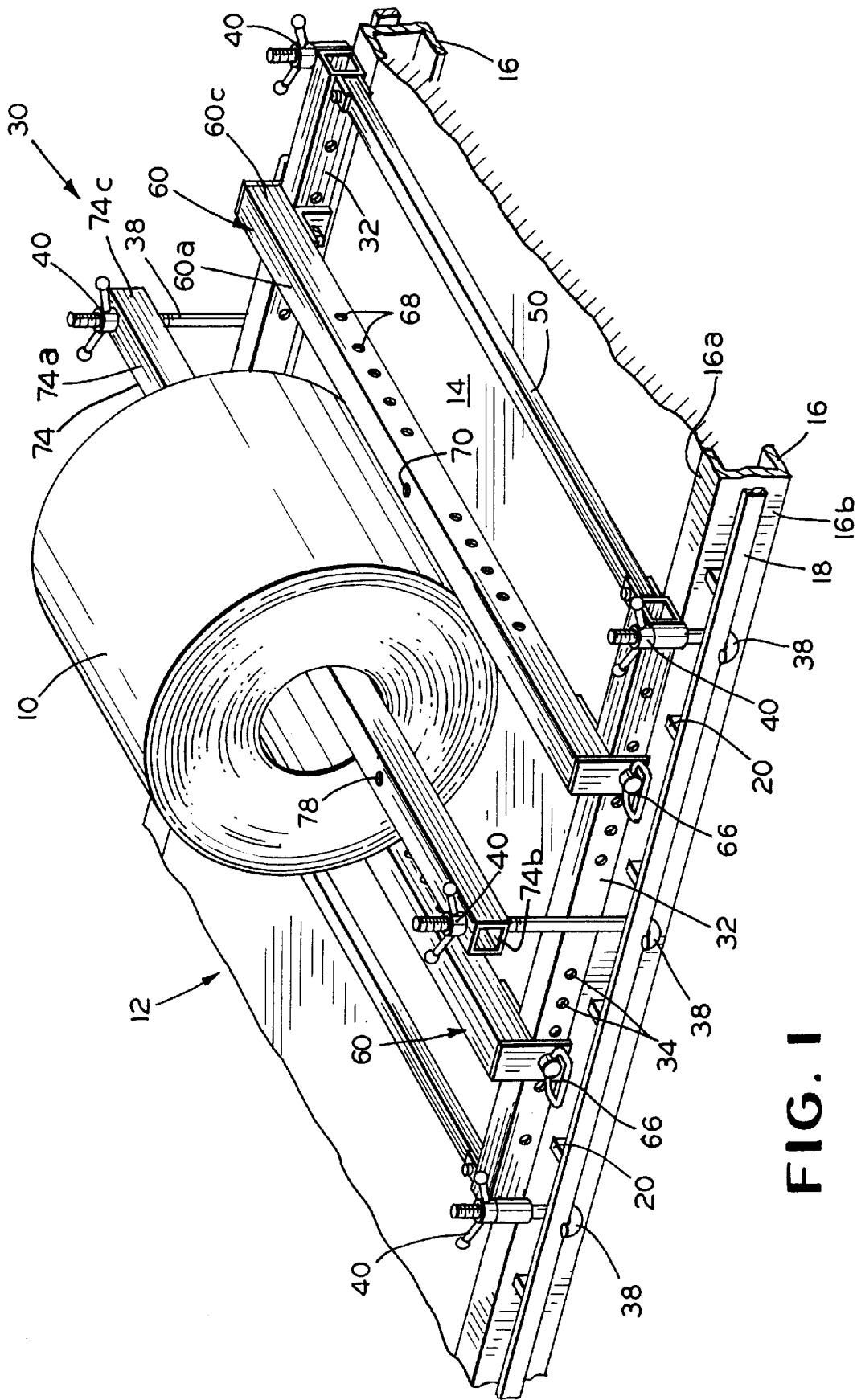
FIG. 1 is a perspective view of the invention in use to secure a coil on a flatbed trailer.

Referring now to the drawings, there is illustrated in FIG. 1 a perspective view of the cylindrical load securing device of the invention in use to secure a cylindrical load on a vehicle flatbed during transportation. In the drawings, the cylindrical load has been illustrated as a coil 10 of wound steel or the like having a central opening or eye extending the length thereof. While a coil 10 has been illustrated, the invention is applicable to the securing of other "cylindrical objects" as defined herein.

The vehicle flatbed, denoted generally by reference numeral 12, is a part of a conventional transportation vehicle, such as a flatbed semi-trailer or rail car. The vehicle flatbed 12 includes a substantially flat, generally horizontally disposed deck 14 on which the coil 10 is supported. The vehicle flatbed 12 is provided with a pair of side support beams 16 extending the length of the flatbed 12 and supporting, in part, the deck 14. The support beams 16 include an upwardly facing top surface 16a and an outwardly facing side surface 16b. A rub-rail 18 is spaced from and secured to each of the support beams 16 by a plurality of support rods 20 or like structures attached to the side surfaces 16b of the beams 16.

A cylindrical load securing device in accordance with the invention is denoted generally in the drawings by reference numeral 30. The load securing device 30 is mounted on the vehicle flatbed 12 to securely retain the coil 10 in position thereon during transportation of the coil. The load securing device 30 of the invention is comprised of a plurality of elongate structural members formed of a suitably strong, rigid material, such as steel. In a preferred embodiment, each of the elongate members is hollow with a rectangular cross section, to increase the overall strength and stability of the load securing device 30 with a minimum of weight.

Figure 3:
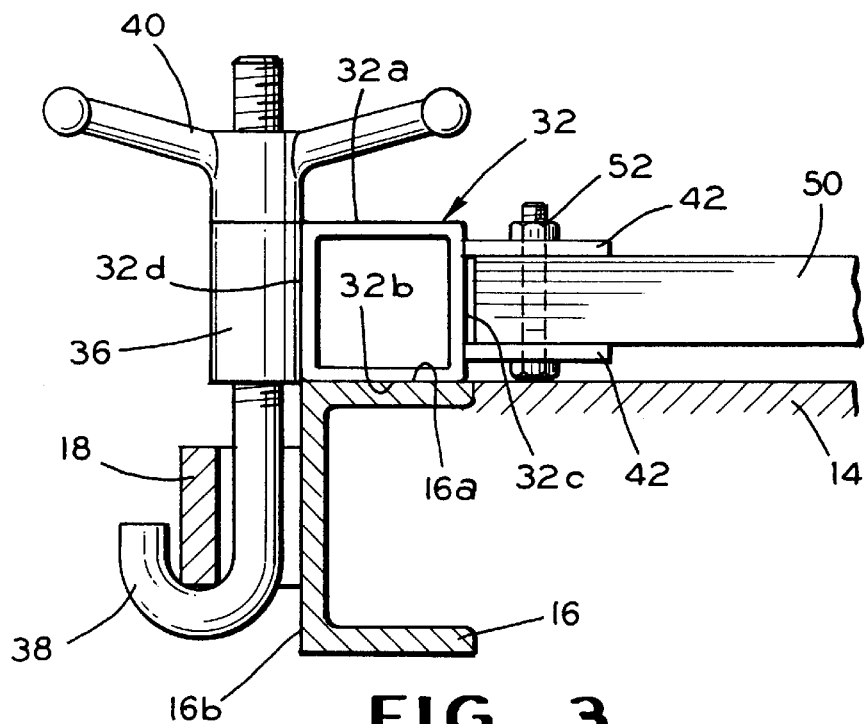
FIG. 3 is an end view of a base member of the load securing device shown in FIG. 1.

A first pair of elongate structural members, or base members 32, are provided to support the load securing device 30 on the vehicle flatbed 12. The two base members 32 are mirror images of one another, so that only one will be described in greater detail. In the preferred embodiment illustrated, the base member 32 is hollow with a rectangular cross section, thus defining an outer top surface 32a, bottom surface 32b, inner side surface 32c, and outer side surface 32d. As best shown in FIG. 3, the base member 32 is supported on the vehicle flatbed 12 with the bottom surface 32b resting on the top surface 16a of the beam 16.

The base member 32 is provided with a plurality of through holes 34 which extend from the outer surface 32d to the inner surface 32c of the base member. The through holes 34 are spaced apart along the length of the base member 32. The base member 32 is further provided with suitable means for selectively and securely mounting to the vehicle flatbed 12. In the preferred embodiment, two or more generally vertically extending sleeves 36 are attached to the outer surface 32d, with at least one proximate each end of the base member 32.

a J-bolt 38 is introduced into each of the sleeves 36 from the lower end thereof, so that the "hook" end of the J-bolt 38 is proximate the rub-rail 18. a handle-type wing nut 40 or the like is threadedly secured to the opposite end of the J-bolt 38. When the nuts 40 are tightened, the "hook" ends of the respective J-bolts 38 are drawn into firm engagement with the rub-rail 18, thereby securely attaching the base member 32 to the flatbed 12 of the transportation vehicle.

The base member 32 may also be provided with a pair of spaced apart flanges 42 extending from the inner surface 32c proximate both ends of the base member. The flanges 36 may be provided with co-axially aligned through holes for securing an optional stabilizing or tie bar 50 between the two base members 32, preferably at each end thereof as shown in FIG. 1. The ends of the tie bars 50 fit between the flanges 42 on the base members 32, and are provided with through holes co-axially aligned with the holes in the flanges 42. Suitable means, such as the nut and bolt assembly 52 illustrated in FIG. 3, are employed to secure the tie bars 50 to the base members 32.

Figure 2:
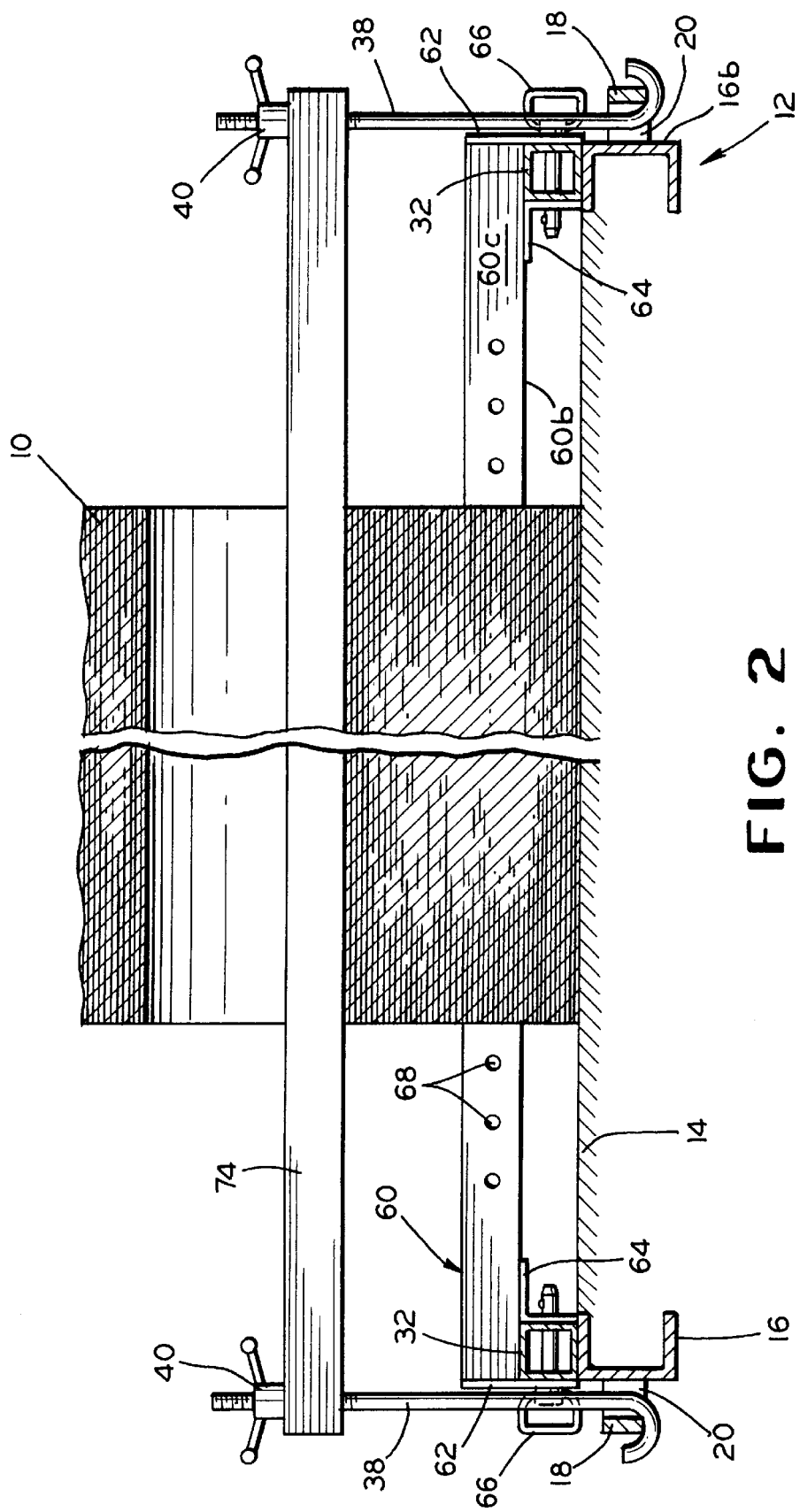
FIG. 2 is a vertical sectional view through the center of the coil shown in FIG. 1.

The load securing device 30 of the invention also includes at least two elongate load securing members 60. The two load securing members 60 are identical, so that only one will be described in greater detail. In the preferred embodiment illustrated, the load securing member 60 is hollow with a rectangular cross section, thus defining an outer top surface 60a, bottom surface 60b (as shown in FIG. 2), and opposed side surfaces 60c.

Figure 4:
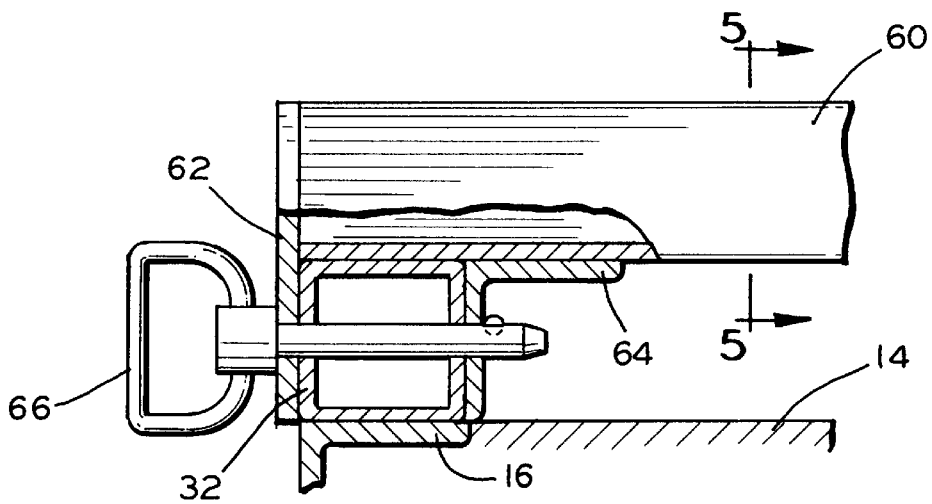
FIG. 4. is a view, partially in section, of a base member as attached to a load securing member of the invention shown in FIG. 1.

Each end of the load securing member 60 is provided with a downwardly extending flange 62, best illustrated in FIG. 4. In addition, an L-shaped bracket 64 is secured to the bottom surface 60b of the load securing member 60. The flange 62 and bracket 64 may be mounted to the load securing member 60 by welding, mechanical fasteners, or other suitable attachment methods.

The flange 62 and bracket 64 are positioned relative to one another so as to define a space in which the base member 32 can be received. The flange 62 and bracket 64 are each provided with a through hole, these through holes being co-axially aligned with one another. When the load securing member 60 is positioned on the base member 32 as shown in FIG. 4, the respective through holes in the flange 62 and bracket 64 are also co-axially alignable with a selected one of the plurality of through holes 34 which extend from the outer surface 32d to the inner surface 32c of the base member 32. The particular through holes 34 are selected so that both of the members 60 abut or nearly abut the outer periphery of the coil 10. a pin, such as the D-handle ball detent pin 66 shown in FIG. 4, extends through the respective holes in the flange 62, base member 32, and bracket 64 to selectively secure the load securing member 60 to the base member 32.

If the load securing device 30 is to be used to secure a cylindrical load having its axis extending along the length of the flatbed 12 as discussed below, the load securing member 60 is preferably provided with a plurality of through holes 68 and 70. The through holes 68 extend between the two side surfaces 60c and are spaced apart along the length of the load securing member 60. The load securing member 60 may also be provided with one or more through holes 70 extending between the top and bottom surfaces, 60a and 60b, thereof.

Figure 5:
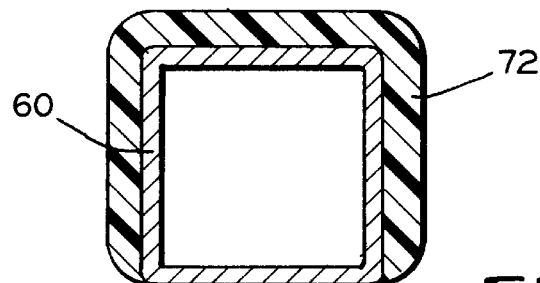
FIG. 5. is a sectional of the load securing member taken along the lines 5—5 of FIG. 4.

The load securing members 60 may advantageously be provided with a protective coating 72 of a resilient material, such as rubber, polyurethane, or the like, to further reduce the risk of damage to the coil 10 or other secured cylindrical object. As shown in FIG. 5, the protective coating 72 may cover only certain portions of the load securing member 60 which come into contact with the secured object. Of course, any through hole in the load securing member 60 would also be extended through the protective coating 72.

Where the cylindrical load to be secured includes a central opening, such as the eye of the wound steel coil 10, a central load securing member 74 is preferably also provided. In the preferred embodiment illustrated, the central load securing member 74 is hollow with a rectangular cross section, thus defining an outer top surface 74a, bottom surface 74b, and opposed side surfaces 74c.

The central load securing member 74 is provided with a through hole 76 proximate each end thereof and extending from the top surface 74a to the bottom surface 74b thereof. Where the cylindrical load 10 is positioned with its axis extending along the length of the flatbed 12, the central load securing member 74 may also be provided with one or more through holes 78 extending between the top and bottom surfaces, 74a and 74b, the purpose of which will be explained below.

The central load securing member 74 extends through the eye of the coil 10 and may be secured to the rub rail 18 of the flatbed 12 with J-bolts 38 in much the same manner as the base members 32, although the J-bolts may need to be of greater length. Preferably, handle-type wing nuts 40 or like devices are provided on the ends of the J-bolts 38 to secure the same as described above. As with the members 60, the central load securing member 74 may also be provided with a protective coating of a resilient material, such as rubber, polyurethane, or the like.

Figure 6:
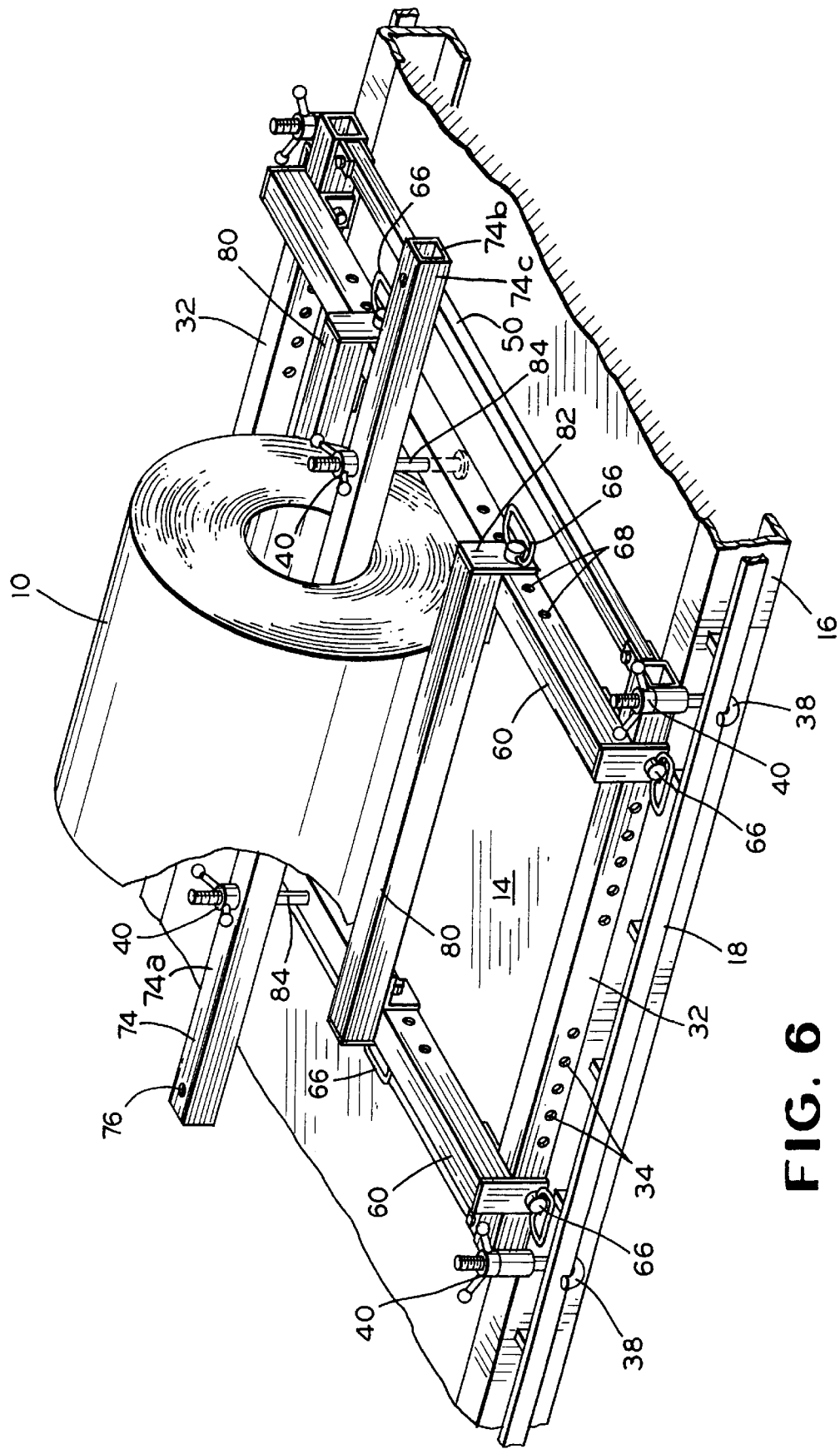
FIG. 6 is a perspective view of the invention in use securing a coil on a flatbed trailer, where the coil is positioned with its longitudinal axis extending along the length of the flatbed trailer.

On occasion, as mentioned above, it may be preferable to position the cylindrical load 10 on the flatbed 12 of the transportation vehicle with its axis generally parallel to the length of the flatbed, as illustrated in FIG. 6. In this situation, the base members 32 are employed as before, and the load securing members 60 are positioned on the base members 32 so as to be spaced from the respective ends of the cylindrical load.

In addition, a third pair of elongate members 80 is provided. Each end of the members 80 is provided with a downwardly extending flange 82 having a hole therethrough. The flanges 82 may be mounted to the members 80 by welding, mechanical fasteners, or other suitable attachment methods.

When the members 80 are positioned across the two load securing members 60, one on either side of the load 10, the hole in each flange 82 is co-axially alignable with a selected one of the plurality of through holes 68 formed in the load securing members 60. a pin, such as the D-handle ball detent pin 66 shown, extends through the respective holes in the flange 82 and load securing member 60 to selectively secure the members 80 to the remainder of the load securing device 30. The particular through holes 68 are selected so that both of the members 80 abut or nearly abut the outer periphery of the coil 10. As with the members 60 and 74, the members 80 may be provided with a protective coating of a resilient material, such as rubber, polyurethane, or the like.

Where the cylindrical load includes a central opening, the central load securing member 74 may be utilized in a manner similar to that discussed above. The central load securing member 74 extends through the eye of the coil 10 and is secured to the load securing members 60. The through holes 78 in the member 74 are co-axially aligned with the through holes 70 in the load securing member 60. Bolts 84 and handle-type wing nuts 40 or like devices are provided to secure the member 74 to the members 60.

The cylindrical load securing device of the invention thus can securely retain a heavy cylindrical object on the flatbed of a transportation vehicle without causing damage to such object. The invention is relatively simple and easy to use, and can be used in conjunction with existing flatbed transportation vehicles.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A load securing device for securing a cylindrical load to a deck of a flatbed transportation vehicle, said device comprising:

a substantially flat, load-supporting deck of the flatbed transportation vehicle;

a pair of rails, one extending along each side of the deck of the vehicle;

first and second elongate base members extending along the length of said deck, said base members being supported on said deck and secured to the adjacent one of said rails in spaced apart relationship;

first and second elongate load securing members extending transversely to said base members said first and second load securing members each having one end portion thereof secured to a top surface of said first base member and an opposite end portion thereof secured to a top surface of said second base member, and being positioned with one of said load securing members on either side of the cylindrical load.

2. A load securing device as defined in claim 1, wherein the cylindrical load includes a central axially extending opening, said device further comprising a central elongate load securing member extending through the central opening in the cylindrical load and being secured to said deck.

3. A load securing device as defined in claim 1, wherein the cylindrical load is positioned on said deck with its longitudinal axis extending along the length of said deck, said device further comprising an additional pair of elongate members positioned across said first and second load securing members, one on either side of the cylindrical load.

4. A load securing device as defined in claim 1, wherein said first and second base members and said first and second load securing members are hollow with a rectangular cross section.

5. A load securing device as defined in claim 4, wherein said first and second base members and said first and second load securing members are formed of steel.

6. A load securing device as defined in claim 1, wherein said first and second load securing members are provided with a resilient coating over at least a portion of their respective outer surfaces.

7. A load securing device as defined in claim 1, wherein said first and second load securing members are adjustably secured to said first and second base members.

8. A load securing device as defined in claim 7, wherein said first and second base members are provided with a plurality of through holes spaced apart along the respective lengths thereof.

9. A load securing device as defined in claim 1, further including a plurality of J-shaped members which secure said base members to said rails.

10. A load securing device for securing a cylindrical load to a deck of a flatbed truck having a rail extending lengthwise along each side edge of said deck, said device comprising:

a substantially flat, load-supporting deck of a flatbed truck having a rail extending lengthwise along each side edge of said deck;

first and second elongate base members extending along the length of said deck, said first base member being supported on said deck and secured to one of said rails and said second base member being supported on said deck and secured to the other of said rails;

first and second elongate load securing members extending transversely to said base members, said first and second load securing members each having one end portion thereof secured to a top surface of said first base member and an opposite end portion thereof secured to a top surface of said second base member, and being positioned with one of said load securing members on either side of the cylindrical load.

* * * * *